(12) United States Patent
Ha et al.

(10) Patent No.: US 12,715,456 B2
(45) Date of Patent: Aug. 25, 2026

(54) METHOD FOR CALIBRATING THE DRIVING ASSESSMENT AND COMPUTING DEVICE USING THE SAME

(71) Applicants: Hyundai Motor Company, Seoul (KR); Kia Corporation, Seoul (KR)

(72) Inventors: Seung Woo Ha, Seoul (KR); Sun Hong Kim, Seoul (KR)

(73) Assignees: Hyundai Motor Company, Seoul (KR); Kia corporation, Seoul (KR)

( * ) Notice: Subject to any disclaimer, the term of this patent is extended or adjusted under 35 U.S.C. 154(b) by 43 days.

(21) Appl. No.: 18/773,660

(22) Filed: Jul. 16, 2024

(65) Prior Publication Data

US 2025/0263084 A1 Aug. 21, 2025

(30) Foreign Application Priority Data

Feb. 21, 2024 (KR) ........................ 10-2024-0024939

(51) Int. Cl.
*B60W 50/02* (2012.01)
*G06Q 40/08* (2012.01)

(52) U.S. Cl.
CPC ......... *B60W 50/0225* (2013.01); *G06Q 40/08* (2013.01); *B60W 2555/20* (2020.02)

(58) Field of Classification Search
CPC ......... B60W 50/0225; B60W 2555/20; B60W 40/09; B60W 2540/30; G06Q 40/08; G07C 5/0808; G07C 5/085
See application file for complete search history.

(56) References Cited

U.S. PATENT DOCUMENTS

| | | | | |
|---|---|---|---|---|
| 10,553,042 | B1 * | 2/2020 | Brinkmann | G06Q 40/08 |
| 11,427,207 | B1 * | 8/2022 | Ethington | G06Q 50/40 |
| 2020/0090426 | A1 * | 3/2020 | Barnes | G06N 5/025 |
| 2020/0334762 | A1 * | 10/2020 | Carver | G07C 5/0825 |

* cited by examiner

*Primary Examiner* — Tarek Elarabi
*Assistant Examiner* — Preston Jay Miller
(74) *Attorney, Agent, or Firm* — Banner & Witcoff, Ltd.

(57) ABSTRACT

A computing device may be configured to perform and/or use a method for calibrating a driving assessment. The method may comprise: creating vehicle trip data, comprising driving assessment data based on vehicle data, in a time series; based on missing trip data from multiple pieces of vehicle trip data, creating perception factor data based on the missing trip data; based on a distribution between the perception factor data and provisional trip data constituting pre-prepared provisional missing data, selecting candidate trip data that is grouped according to a number of trip misses among the provisional trip data; estimating the number of trip misses from the grouped candidate trip data that has a highest matching degree for the missing trip data; and restoring the missing trip data based on candidate assessment factor data that belongs to the candidate trip data corresponding to the estimated number of trip misses.

20 Claims, 10 Drawing Sheets

100
102
COMMUNICATION UNIT
108
PROCESSOR
106
MEMORY
104
PERIPHERAL DEVICE

FIG. 5

| TRIP No. | TRAVEL DATA | | | | ASSESSMENT FACTOR DATA | | DRIVING ASSESSMENT DATA (VIRTUAL UBI) |
|---|---|---|---|---|---|---|---|
| | LOCATION LOCATION | END LOCATION | VARIATION OF LOCATION | DRIVING DISTANCE | SUDDEN ACCELERATION | SUDDEN DECELERATION | |
| 1 | 10 | 20 | 10 | 10 | 2 | 2 | 50 |
| 2 | 20 | 29 | 9 | 5 | 2 | 1 | 50.5 |
| 3 | 29 | 41 | 12 | 7 | 1 | 1 | 51 |
| ⋮ | ⋮ | ⋮ | ⋮ | ⋮ | ⋮ | ⋮ | ⋮ |

FIG. 6

| NUMBER OF TRIP MISSES | PROVISIONAL TRAVEL DATA | | PROVISIONAL ASSESSMENT FACTOR DATA | | PROVISIONAL DRIVING ASSESSMENT DATA (VIRTUAL UBI) |
|---|---|---|---|---|---|
| | VARIATION OF LOCATION | DRIVING DISTANCE | SUDDEN ACCELERATION | SUDDEN DECELERATION | |
| 1 | 10 | 10 | 2 | 2 | 50 |
| 1 | 9 | 5 | 2 | 1 | 50.5 |
| 1 | 12 | 7 | 1 | 1 | 51 |
| ⋮ | ⋮ | ⋮ | ⋮ | ⋮ | ⋮ |
| 2 | 19 | 15 | 4 | 3 | 50 |
| 2 | 21 | 12 | 3 | 2 | 50 |
| ⋮ | ⋮ | ⋮ | ⋮ | ⋮ | ⋮ |
| 3 | 31 | 22 | 5 | 4 | 50 |
| ⋮ | ⋮ | ⋮ | ⋮ | ⋮ | ⋮ |

FIG. 8

| TRIP No. | TRAVEL DATA | | | | ASSESSMENT FACTOR DATA | | DRIVING ASSESSMENT DATA (UBI) |
|---|---|---|---|---|---|---|---|
| | START LOCATION | END LOCATION | VARIATION OF LOCATION | DRIVING DISTANCE | SUDDEN ACCELERATION | SUDDEN DECELERATION | |
| ⋮ | ⋮ | ⋮ | ⋮ | ⋮ | ⋮ | ⋮ | ⋮ |
| n | 50 | 52 | 2 | 30 | 0 | 0 | 50 |
| - | VEHICLE TRIP DATA MISS | | | | | | |
| n+1 | 78 | 23 | 19 | 15 | 0 | 1 | 51 |
| ⋮ | ⋮ | ⋮ | ⋮ | ⋮ | ⋮ | ⋮ | ⋮ |

NUMBER OF TRIP MISSES: 1

NUMBER OF TRIP MISSES: 2

NUMBER OF TRIP MISSES: 3

FIG. 11

| NUMBER OF TRIP MISSES | TOTAL NUMBER OF PROVISIONAL TRIP DATA(a) | NUMBER OF GROUPED PROVISIONAL TRIP DATA(b) | NUMBER OF CANDIDATE TRIP DATA(c) | CANDIDATE ASSESSMENT FACTOR DATA | PROBABILITY OF SIMILARITY(p) |
|---|---|---|---|---|---|
| 1 | 1000 | 500 | 30 | SUDDEN ACCELERATION 1.3, SUDDEN DECELERATION 1.4 | 0.03 |
| 2 | 1000 | 300 | 10 | SUDDEN ACCELERATION 1.6, SUDDEN DECELERATION 2.1 | 0.01 |
| 3 | 1000 | 200 | 5 | SUDDEN ACCELERATION 1.9, SUDDEN DECELERATION 2.0 | 0.005 |
| 4 | ⋮ | ⋮ | ⋮ | ⋮ | ⋮ |

METHOD FOR CALIBRATING THE DRIVING ASSESSMENT AND COMPUTING DEVICE USING THE SAME

CROSS REFERENCE TO RELATED APPLICATION

The present application claims priority to Korean provisional application No. 10-2024-0024939, filed Feb. 21, 2024, the entire contents of which are incorporated herein for all purposes by this reference.

FIELD

The present disclosure relates to a method for calibrating driving assessment and a computing device using the same, and more particularly, to a method for calibrating driving assessment and a computing device, which calibrate missing data with high accuracy to implement good driving assessment despite omission of data used for driving assessment.

BACKGROUND

Generally, vehicle owners insure their vehicles to prepare themselves for accidents. As each owner pays a predetermined amount of money, when an accident occurs, damage from the vehicle is covered by vehicle insurance. An insurance premium to be paid may be determined based on the age and model of the vehicle, accident-free history, and the like, and in recent years, various factors other than the above-described items may be considered for calculation.

For example, even if a vehicle has no history of accident, an insurance premium may be increased or decreased by driving patterns and habits of a driver who uses the vehicle. That is, based on driving assessment for the driver according to driving patterns and habits, the insurance premium may be different even under the same conditions of age and model. Driving assessment is implemented by quantified data and may be calculated based on vehicle data that enables driving patterns and habits to be estimated. The vehicle data may be data associated with various vehicle behaviors caused by driving.

Apart from the insurance field, driving assessment may be widely used in various mobility services. Specifically, driving assessment may be used for a fleet service for providing vehicle sharing services, a lease service for renting a vehicle over a long time, and a vehicle-based financial service. Data associated with driving assessment may be used to determine fees, benefits, penalty and credit rating for the above-described services.

Vehicle data for driving assessment is generated in a vehicle by detecting vehicle behaviors mostly caused by a vehicle user's operation and may be transmitted to a server for driving assessment. For accurate driving assessment, vehicle data needs to be delivered to the server without loss.

Nevertheless, some vehicle data may be missing for various reasons including error of a communicator or server installed in a vehicle, poor communication, or driving or parking in a communication shadow area, and vehicle data in missing state may be transmitted.

Conventionally, to process driving assessment according to missing vehicle data, a server corrects a missing data value through a proportion of a driving distance with missing data to an overall driving distance and then assesses driving by the corrected value. The conventional method uses simple interpolation according to a missing driving distance but does not consider a driving characteristic close to an actual situation. Furthermore, in case a missing driving distance is a very long distance, the conventional method does not consider driving characteristics such as a driving route of a driver and discontinuous driving due to frequent turning-on/off. According to the conventional method, because corrected vehicle data has significant error with respect to actual missing vehicle data, driving assessment may be inaccurately processed.

Accordingly, various studies for accurate estimation of missing vehicle data are underway to achieve good driving assessment.

SUMMARY

The following summary presents a simplified summary of certain features. The summary is not an extensive overview and is not intended to identify key or critical elements.

Systems, apparatuses, and methods are described for calibrating driving assessment. A method may comprise: creating a time series of vehicle trip data comprising driving assessment data based on vehicle data from a vehicle; creating, based on a determination of trip data missing from the time series of the vehicle trip data, perception factor data associated with the missing trip data; based on a distribution between the perception factor data and provisional trip data from provisional missing data, selecting candidate trip data that is grouped according to numbers of trip misses from the provisional trip data; estimating a number of trip misses based on the group of candidate trip data that has a highest matching degree with the missing trip data; and restoring the missing trip data based on candidate assessment factor data from the candidate trip data corresponding to the estimated number of trip misses. The method may comprise sending information, based on the restored missing trip data, configured to control one or more operations of the vehicle.

Also, or alternatively, computing device may comprise: a communication unit configured to communicating with a vehicle; a memory comprising at least one instruction; and a processor. The at least one instruction, when executed by the processor, may configure the processor to: create a time series of vehicle trip data comprising driving assessment data based on vehicle data from the vehicle, create, based on a determination of trip data missing from the time series of the vehicle trip data, perception factor data associated with the missing trip data, based on a distribution between the perception factor data and provisional trip data from provisional missing data, select candidate trip data that is grouped according to numbers of trip misses from the provisional trip data, estimate a number of trip misses based on the group of candidate trip data that has a highest matching degree with the missing trip data, and restore the missing trip data based on candidate assessment factor data from the candidate trip data corresponding to the estimated number of trip misses. The at least one instruction, when executed by the processor, may configure the processor to send information, based on the restored missing trip data, configured to control one or more operations of the vehicle.

Also, or alternatively, a system may comprise: a computing device; and a vehicle. The computing device may comprise: a memory comprising at least one instruction, and a processor. The at least one instruction, when executed by the processor, may configure the processor to: create a time series of vehicle trip data comprising driving assessment data based on vehicle data from the vehicle, create, based on a determination of trip data missing from the time series of the vehicle trip data, perception factor data associated with the missing trip data, based on a distribution between the perception factor data and provisional trip data from provisional missing data, select candidate trip data that is grouped according to numbers of trip misses from the provisional trip data, estimate a number of trip misses based on the group of candidate trip data that has a highest matching degree with the missing trip data, restore the missing trip data based on candidate assessment factor data from the candidate trip data corresponding to the estimated number of trip misses, and send information, based on the restored missing trip configured to control one or more operations of the vehicle. The vehicle may be configured to receive the information These and other features and advantages are described in greater detail below.

BRIEF DESCRIPTION OF THE DRAWINGS

FIG. 5 is a view exemplifying summary data.

FIG. 6 is a view exemplifying provisional missing data.

FIG. 8 is a view exemplifying missing vehicle trip data.

FIG. 11 is a view exemplifying creation of recovery trip data.

DETAILED DESCRIPTION

Figures 1, 2:
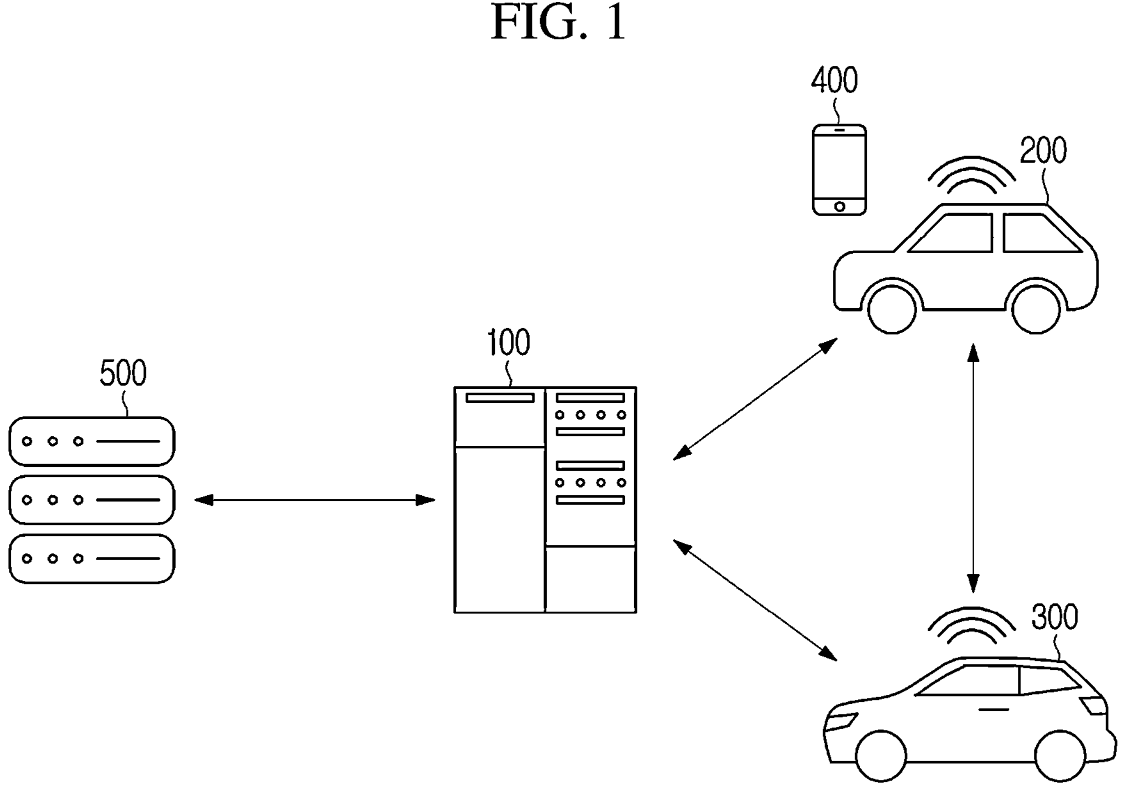
FIG. 1 is a view exemplifying a computing device transmitting and receiving data in communication with an electronic device including a vehicle.
FIG. 2 is a view showing constituent modules of a computing device according to another example of the present disclosure.

Hereinafter, examples of the present disclosure will be described in detail with reference to the accompanying drawings so that those skilled in the art may easily implement the present disclosure. However, the present disclosure may be implemented in various different ways, and is not limited to the examples described therein.

In describing examples of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. Also, or alternatively, when an element "includes", "comprises" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an example could be termed a second element in another example, and, similarly, a second element in an example could be termed a first element in another example, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed examples are included in the scope of the present disclosure.

In the present disclosure, elements described in various examples do not necessarily mean essential elements, and some of them may be optional elements. Therefore, an example composed of a subset of elements described in an example is also included in the scope of the present disclosure. Also, or alternatively, examples including other elements in addition to the elements described in the various examples are also included in the scope of the present disclosure.

The advantages and features of the present disclosure and the way of attaining them will become apparent with reference to examples described below in detail in conjunction with the accompanying drawings. Examples, however, may be embodied in many different forms and should not be constructed as being limited to example examples set forth herein. Rather, these examples are provided so that this disclosure will be complete and will fully convey the scope of the disclosure to those skilled in the art.

In the present disclosure, each of phrases such as "A or B", "at least one of A and B", "at least one of A or B", "A, B or C", "at least one of A, B and C", ""at Each of the phrases such as "at least one of A, B or C" and "at least one of A, B, C or combination thereof" may include any one or all possible combinations of the items listed together in the corresponding one of the phrases.

In the present disclosure, expressions of location relations, such as "upper", "lower", "left" and "right", are employed for the convenience of explanation, and in case drawings illustrated in the present specification are inversed, the location relations described in the specification may be inversely understood.

Hereinafter will be described a system of implementing correction of driving assessment according to an example of the present disclosure, with reference to FIG. 1 to FIG. 3. FIG. 1 is a view exemplifying a computing device transmitting and receiving data in communication with an electronic device including a vehicle.

Referring to FIG. 1, a system of implementing correction of driving assessment and transmitting and receiving corrected driving assessment may include a computing device 100 and electronic devices 200, 300, 400 and 500.

The computing device 100 may receive vehicle data from vehicles 200 and 300 (e.g., electronic devices and/or computing devices on vehicles 200 and 300), assess driving of the vehicles 200 and 300, and transmit driving assessment data created by (e.g., generated based on and/or as a result of) the assessment to any of the electronic devices 200 to 500. For example, the computing device 100 may be/comprise a vehicle management server that controls overall driving and/or operation of the vehicles 200 and 300. As another example, the computing device 100 may be an insurance server for supporting a vehicle insurance service, a fleet server for providing a vehicle sharing service, a lease server for renting a vehicle (e.g., for a long time), and/or a financial server for supporting a vehicle-based financial service. In the present disclosure, for convenience of explanation, the computing device 100 is exemplified as a vehicle management server, but the present disclosure may also be applied to a server exemplified as another example.

The electronic devices 200 to 500 may be devices that exchange (e.g., send and/or receive) data with the computing device 100. The electronic devices 200 to 500 may include at least one of vehicles 200 and 300 capable of moving via driving, a user terminal 400 accessible to a user associated with (e.g., of) the vehicles 200 and/or 300, and/or a service server 500 that utilizes driving assessment to provide a vehicle-based mobility service. The user terminal 400 may be a wired and/or wireless terminal. The user terminal 400 may receive driving assessment information including at least driving assessment data from the computing device 100. Also, or alternatively, for example, the service server 500 may be at least one of an insurance server, a fleet server, a lease server, and a financial server, receive driving assessment information from the computing device 100, and support a corresponding service. In FIG. 1, the vehicles 200 and 300 and the user terminal 400 are illustrated to exchange data via the computing device 100 that serves as a vehicle management server, but are not limited thereto. Specifically, the vehicles 200 and 300 and the user terminal 400 may have direct communication with the service server 500 in order to utilize a unique service from the service server 500.

FIG. 2 is a view showing constituent modules of a computing device according to another example of the present disclosure.

The computing device 100 may include a communication unit 102, a peripheral device 104, a memory 106, and a processor 108.

The communication unit 102 may support mutual communication with the vehicles 200 and 300, the user terminal 400, and the service server 500. In the present disclosure, the communication unit 102 may receive data created by driving or turning-off of the vehicles 200 and 300 from the vehicles 200 and 300 and transmit data and a software module created from the computing device 100 to the vehicles 200 and 300. Also, or alternatively, the communication unit 102 may receive a request and information from the user terminal 400 and the service server 500 and transmit data output through the processor 108 of the computing device 100 to the user terminal 400 and the service server 500. In the present disclosure, the computing device 100 may transmit and receive data used in the method according to the present disclosure to and from the outside through the communication unit 102.

The peripheral device 104 may be equipped with an input/output interface of the computing device 100 and a module for connecting to another device.

The memory 106 may store an application and/or various data/one or more instructions for vehicle control, management and/or driving assessment. The processor 108 may be configured to load the application and/or read and/or record data from/to the memory 106. The vehicle control may include providing control information for performing vehicle driving or supplementary functions to the vehicles 200 and 300 or providing data and control information for processing semi-autonomous or fully autonomous driving to the vehicles 200 and 300.

Data associated with driving assessment may include driving assessment information comprising vehicle data received from the vehicles 200 and 300 and driving assessment data based on the vehicle data. For example, the driving assessment information may be created to have time-series vehicle trip data in trip units according to a preset condition. The driving assessment information may have multiple pieces of vehicle trip data (e.g., trip units) listed in a time series. A condition for defining a trip unit may be, for example, at least one of an operating state, an operating distance, an operating time, and a location of the vehicles 200 and 300. The operating state of the vehicles 200 and 300 may mean a state associated with a specific operation or a predetermined behavior for the vehicles 200 and 300. For example, the operating state may be a turned-on state of the vehicles 200 and 300, a parking state of the vehicles 200 and 300 (e.g., while being turned on), and the like. As for the turned-on state, for example, an interval from a turn-on point to a turn-off point may be designated as a trip unit. In this case, the vehicles 200 and 300 may obtain vehicle data from turn-on to turn-off, and the computing device 100 may receive vehicle data from the vehicle 200 and 300 after turn-off and/or during the trip (e.g., the vehicle data may be streamed to the computing device 100). The operating distance and/or the operating time may be a predetermined distance interval and/or a predetermined time interval. The locations of the vehicles 200 and 300 may be, for example, a region with predetermined good quality of communication, a region related to a traffic situation expected by the computing device 100, and a designated region.

For example, the vehicle data may include travel data and/or assessment factor data. The travel data may have at least one of location information in trip units and/or a driving distance in trip units. The location information may include location data of a start point and an end point of a trip section and a variation of location between these points. For example, the location data of a start point and an end point may be GPS data and consist of latitude and longitude coordinates. The assessment factor data may be used to create driving assessment data.

For example, the assessment factor data may include data associated with at least one of sudden behaviors of the vehicles 200 and 300, behaviors of the vehicles 200 and 300 in a driving caution zone, an external driving environment of the vehicles 200 and 300, and a user request in an autonomous driving mode. For example, assessment factor data associated with a sudden behavior may refer to a driving history where a speed and/or acceleration (a linear and/or a turning acceleration) according to at least one of longitudinal direction and/or transverse direction of the vehicles 200 and 300 are equal to or above a threshold speed and/or threshold acceleration and/or threshold turning. Specifically, the assessment factor data associated with the sudden behavior may include a number associated with at least one of sudden acceleration, sudden deceleration and/or sudden turning.

Assessment factor data associated with a behavior in a driving caution zone may be a history of speeding beyond a speed limit in a region with speed restrictions. For example, the driving caution zone may be a speed restriction zone, a protection zone for the elderly and/or the disabled, a school zone, and the like.

Assessment factor data according to an external driving environment may comprise a history associated with driving that violates a safe driving behavior in a driving environment with an accident risk level exceeding a reference risk level, and may be a number of driving cases that violate safe driving behaviors, for example, at night, in bad weather, and in an accident black spot.

Assessment factor data according to a user request in an autonomous driving mode may be a driving history where driving that violates a safe driving behavior is performed under a user request when the autonomous driving mode is set to observe the safe driving behavior. The autonomous driving mode may be a semi-autonomous driving mode and/or a fully-autonomous driving mode. A number of driving requests ignoring a safety vehicle-to-vehicle distance and a safety speed set in the mode and a number of overtake requests not expected in the mode may be reflected in assessment factor data according to a user request.

Driving assessment data may be created as a quantified value. For example, driving assessment data may comprise, for example, a usage-based insurance score.

Also, or alternatively, in case the memory 106 does not receive vehicle data from the vehicles 200 and 300 and thus there is missing vehicle trip data, the memory 106 may have provisional missing data that is used to restore the missing trip data.

Provisional missing data may be provided and/or generated/created by using summary data that has multiple pieces of trip data that record driving assessment data in trip units. Provisional missing data may include provisional trip data that is provided according to (e.g., provided and/or generated based on) a number of trip misses based on trip data in at least one trip (or trip section). In order to estimate a number of unknown misses for missing trip data, provisional missing data may have at least one piece of provisional trip data according to a number of trip misses. Provisional location information, where provisional trip data is created, may be tagged on the provisional trip data. A process of restoring missing trip data may use provisional trip data that belongs to a similar extent to location information of the missing trip data. Provisional trip data may include provisional travel data, provisional assessment factor data, and provisional driving assessment data. Similar to a format of travel data in driving assessment information, provisional travel data may include a location variation and a driving distance. Provisional assessment factor data may be provided to have an actually same format as assessment factor data in driving assessment information. Provisional driving assessment data may be configured in an actually same format as driving assessment data in driving assessment information. Provisional missing data will be described in detail below.

Also, or alternatively, the memory 106 may store an application and/or at least one instruction that, when executed by the processor 108, create vehicle trip data including driving assessment data based on vehicle data in time series. The memory 106 may store an application and/or an instruction that, when executed by the processor 108, configure the processor 108 to, when (e.g., based on a determination of) missing trip data occurs among multiple pieces of vehicle trip data, estimate a number of trip misses and assessment factor data based on perception factor data and provisional missing data, which are identified from the missing trip data, and restore the missing trip data based on the estimated assessment factor data.

The processor 108 may control of the computing device 100 and/or process vehicle control, management and driving assessment. The processor 108 may be configured to execute an application and an instruction stored in the memory 106.

The processor 108 may create vehicle trip data in time series including driving assessment data based on vehicle data by using an application, an instruction and/or data stored in the memory 106. In response to occurrence/detection of missing trip data from/inferred from multiple pieces of vehicle trip data, the processor 108 may create/generate perception factor data inferred from the missing trip data. The processor 108 may implement processing to select candidate trip data grouped according to a number of trip misses in provisional trip data based on distribution of the provisional trip data that constitutes perception factor data and provisional missing data. The processor 108 may execute processing of estimating a number of trip misses from the grouped candidate trip data with a highest matching degree with missing trip data and restoring the missing trip data based on candidate assessment factor data that belongs to candidate trip data corresponding to the estimated number of trip misses. At a request of the electronic devices 200 to 500, the processor 108 may perform processing of transmitting driving assessment data, which is corrected based on restored missing trip data, to the electronic devices 200 to 500.

The processor 108 may be implemented as a single processing module and/or a plurality of processors. For example, processing according to the above description may be performed as distributed processing in a plurality of processing modules, and the processor 108 in the present disclosure may collectively refer to the plurality of processing modules.

Figure 3:
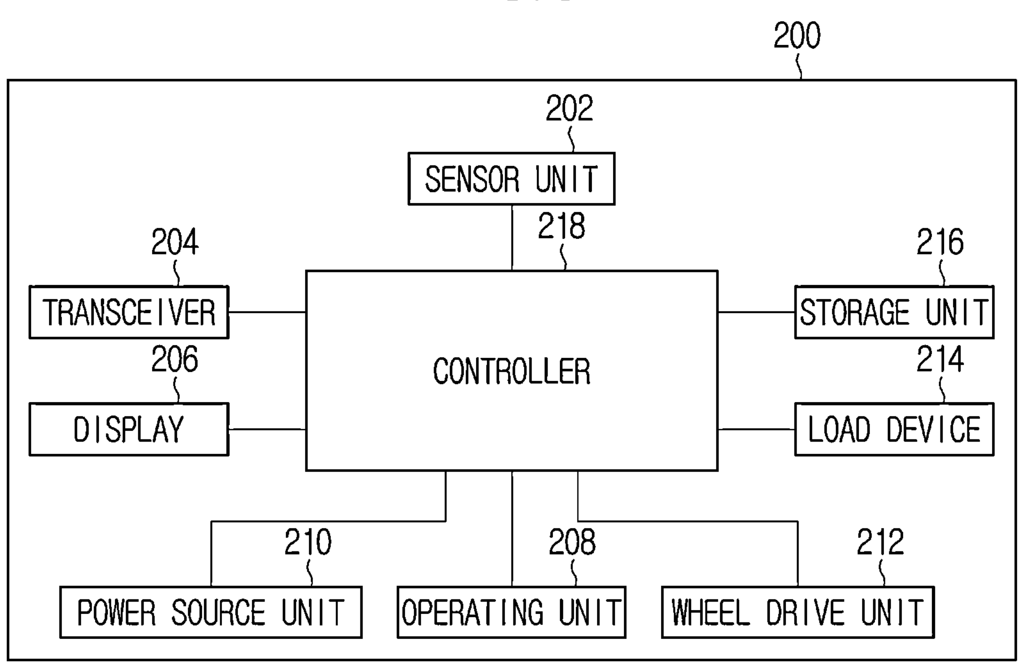
FIG. 3 is a view showing constituent modules of a vehicle according to the present disclosure.

FIG. 3 is a view showing constituent modules of a vehicle according to the present disclosure. FIG. 1 illustrates the plurality of the vehicles 200 and 300, but hereinafter, for convenience of explanation, a vehicle will be described referring to the vehicle 200. However, an example according to the present disclosure may also or alternatively be applied to the vehicle 300, that is another vehicle communicating with the vehicle 200.

The vehicle 200 may be driven based on electric energy or fossil energy. In the case of electric energy, for example, the vehicle 200 may be a pure battery-based vehicle driven only by a high-voltage battery or employ a gas-based fuel cell as an energy source. In the case of fossil energy, the vehicle 200 is driven based on fuels such as gasoline, diesel, or liquefied gas, and may be equipped with an engine that drives a wheel drive unit 212 by combustion of the fuel. The engine may be included in a power source unit 210 from a perspective of providing a driving torque of a wheel to the wheel drive unit 212. As another example, the vehicle 200 may use a hybrid form of power source that combines an electric battery and a fossil fuel-based engine.

The vehicle 200 may refer to a device capable of moving. The vehicle 200 may be a vehicle as a ground vehicle driven on the ground and/or may be a passenger vehicle and/or commercial vehicle, a purpose built vehicle (PBV), and the like. The vehicle 200 may be a four-wheel vehicle, for example, a sedan, a sports utility vehicle (SUV), and a pickup truck and may also be a vehicle with five or more wheels, for example, a bus, a lorry, a container truck, and a heavy vehicle. The vehicle 200 may be driven by being controlled in autonomous driving, and the autonomous driving may be implemented as semi-autonomous driving or full autonomous driving.

The vehicle 200 may perform communication with the computing device 100, another vehicle 300 and/or other electric devices 400 and 500. For example, the vehicle 200 may assist a user in driving or support autonomous driving of the vehicle 200. For example, the vehicle 200 may assist driving or support autonomous driving by exchanging vehicle perception data, driving control and situation data, environment data surrounding the vehicle, and map data (e.g., via vehicle-to-everything V2X) with the computing device 100 and/or the other vehicle 300.

The vehicle 200 may communicate with another vehicle (e.g., vehicle 300) and/or another device (e.g., devices 100, 400, 500) based on cellular communication, wireless access in vehicular environment (WAVE) communication, dedicated short range communication (DSRC) or short range communication, or any other communication scheme. For example, the vehicle 200 may use LTE as a cellular communication network, a communication network such as 5G, a WiFi communication network, a WAVE communication network, and the like to communicate with the computing device 100 and other electronic devices 300, 400 and 500. As another example, DSRC used in the vehicle 200 may be used for vehicle-to-vehicle communication. A communication scheme is not limited to the above-described example.

The vehicle 200 may include a sensor unit 202, a transceiver 204, and/or a display 206.

The sensor unit 202 may be equipped with various types of detectors for sensing various states and situations occurring in external and internal environments of the vehicle 200 and/or for identifying location data of the vehicle 200. That is, the sensor unit 202 may be configured as a multiple sensor module including heterogeneous sensors to obtain sensing data detected from each of the sensors. Specifically, the sensor unit 202 may be equipped with an image sensor, a radar sensor, and/or a Lidar sensor for perceiving dynamic and static objects present around the vehicle 200. The vehicle may have a positioning sensor for obtaining location data of the vehicle. The sensor unit 202 may also, or alternatively, be equipped with a gyro sensor, an acceleration sensor, a wheel sensor, an autometer, a speed sensor and the like, in order to identify its own location, driving position, and/or speed. The present disclosure may further include a sensor for detecting various situations/parameters not listed herein.

The transceiver 204 may support mutual communication with the computing device 100, the neighbor vehicle 300, the user terminal 400, and the service server 500. In the present disclosure, the transceiver 204 may transmit (e.g., send) data, which may be generated or stored during driving, to another device and receive data and a software module transmitted from another device. In the present disclosure, the vehicle 200 may transmit and receive data used in a method according to the present disclosure to and from the outside through the transceiver 204.

The display 206 may serve as a user interface. By the processor 108, the display 206 may display an operating state and a control state of the vehicle 200, path/traffic information, information on an energy remaining quantity, a content requested by a driver, and the like to be output. The display 206 may be configured as a touch screen capable of sensing a driver input and receive a request of a driver indicated to the processor 108.

The vehicle 200 may include an operating unit 208, a power source unit 210, a wheel drive unit 212, and a load device 214.

The operating unit 208 may be equipped with at least one module for implementing a driving operation and perform at least one driving operation of longitudinal control like acceleration/deceleration and transverse control like steering. The operating unit 208 may be equipped with not only a pedal and a steering wheel accepting a user's request for the control but also various operating modules for generating a driving operation according to the request in the wheel drive unit 212.

The power source unit 210 may generate and supply power and electricity used for a driving power system like the wheel drive unit 212 and the load device 214. In case the vehicle 200 is driven based on electric energy, for example, the power source unit 210 may be configured as an electric battery or be configured as a combination of an electric battery and a fuel cell for charging the battery. In case the vehicle 200 is driven based on fossil energy, the power source unit 210 may be configured as an internal combustion engine.

The wheel drive unit 212 may include a plurality of wheels, a driving force transfer module for generating and giving a driving force to wheels or for transferring a driving force, a braking module for decelerating the driving of wheels, and a steering module for realizing transverse control of wheels. In case the vehicle 200 is driven based on electric energy, the driving force transfer module may be configured as a motor module that generates a driving force based on power output from an electric battery. In case the vehicle 200 is operated based on fossil energy, a driving force transfer module may be equipped with transmission and a gear module that transfer power of an internal combustion engine.

The load device 214 may be an auxiliary equipment mounted on the vehicle 200, which consumes power supplied from the power source unit 210 by use of an occupant or user or converted from output of the power source unit 210. The load device 214 may be a type of electric device for non-driving purpose excluding a driving power system like the wheel drive unit 212 in the present disclosure. For example, the load device 214 may be an air-conditioning system, a light system, a seat system, and various devices installed in the vehicle 200.

Also, or alternatively, the vehicle 200 may include a storage unit 216 and a controller 218.

The storage unit 216 may store an application (e.g., for controlling the vehicle 200) and/or various data and load the application or read and record data at a request of controller 218 and/or a processor of the vehicle and/or the processor 108. In the present disclosure, the storage unit 216 (which may be a memory, such as memory 106) may store location data and a location change in a trip section, which are obtained through a positioning sensor of the sensor unit 202, and have assessment factor data that is created by the sensor unit 202 or the controller 218.

For example, the assessment factor data may include data associated with at least one of sudden behaviors of the vehicle 200, a behavior of the vehicle 200 in a driving caution zone, an external driving environment of the vehicle 200, and/or a user request in an autonomous driving mode. In case of a sudden behavior, a speed and/or a turning degree according to at least one of longitudinal direction and transverse direction may be obtained by the sensor unit 202. Driving and/or speed violation in a driving caution zone may be identified via/using/based on map information, location data, and/or a measured speed. An external driving environment may be recognized from weather information provided from, for example, the computing device 100, time information, and map information embedded in the storage unit 216. A behavior violating a safe driving behavior in an external driving environment may be perceived by, for example, the sensor unit 202 or the controller 218. In driving set to an autonomous driving mode, a user request for driving, which violates a safe driving behavior, may be identified by the controller 218.

The controller 218 may perform overall control of the vehicle 200. The controller 218 may comprise a processor, as described with respect to processor 108, and be configured to execute an application and/or an instruction stored in the storage unit 216. In relation to the present disclosure, the controller 218 may transmit vehicle data such as travel data and/or assessment factor data in trip units to the computing device 100 by using an application, an instruction and/or data stored in the storage unit 216.

In the present disclosure, as an example, the controller 218 may be implemented as a single processing module. As another example, the controller 218 may be implemented by distributed processing in a plurality of processing modules, and the controller 218 in the present disclosure may collectively refer to the plurality of processing modules.

Hereinafter, correction processing of driving assessment through the processor 108 of the computing device 100 will be described in detail through FIG. 4 to FIG. 11.

Figure 4:
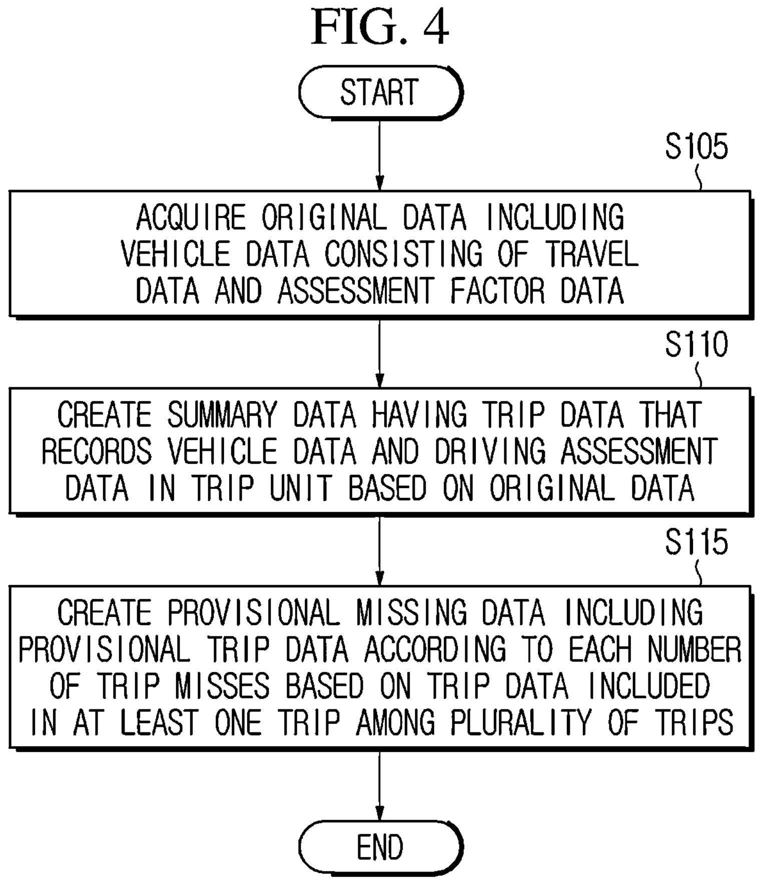
FIG. 4 is a flowchart showing a process of creating provisional missing data.

FIG. 4 is a flowchart showing a process of creating provisional missing data.

First, the processor 108 of the computing device 100 may receive vehicle data consisting of travel data and/or assessment factor data from at least one or more vehicles 200 and 300, manage the vehicle data in the memory 106, and acquire original data including the managed vehicle data in a unit of time from the memory 106 (S105).

The vehicle data received from at least one or more of vehicles 200 and 300 may be received in a unit of trip(s). The vehicle data may be created from the vehicles 200 and/or 300 at a predetermined time interval, for example, 1-second interval, and/or vehicle data of every time interval may be processed into vehicle trip data and be transmitted to the computing device 100. The original data may consist of trip-based packaged vehicle data that is distinguished according to a predetermined unit of time (e.g., time stamp). The original data may be the same as vehicle data that is created from the vehicles 200 and/or 300 at a specific time interval, and may have travel data per a unit of time and assessment factor data per a unit of time.

For convenience of explanation, travel data is described to have both location data and a driving distance, but may have only either type of the information. Location information may include location data of a start point and/or an end point, which belong to (e.g., correspond to) a predetermined time section, and/or a variation of location of (associated with) the time section. Location information described in a trip unit may include location data of a start point and/or an end point of a trip section and/or a variation of location of the trip section. In the present disclosure, a trip unit or a trip section is exemplified to be defined by an operating state of the vehicles 200 and 300, and specifically, a turned-on state of the vehicles 200 and 300. A section from a turned-on point to a turned-off point may be designated as a trip unit. The above-described trip unit is described as an illustrative example and may be designated as described with respect to FIG. 1 and FIG. 2. Also, or alternatively, in the description below, assessment factor data is exemplified as indicating a history associated with (e.g., of/indicating) sudden behaviors of the vehicles 200 and/or 300 in a time section and/or trip section. Specific examples are numbers of sudden acceleration and/or sudden deceleration in a time section or trip section. However, assessment factor data may also, or alternatively, include various data described with respect to FIG. 1 and FIG. 2.

Next, the processor 108 of the computing device 100 may create summary data having trip data that records vehicle data and driving assessment data in a trip unit based on original data (S110).

The processor 108 may distinguish the original data in the trip unit by analyzing the original data that is sorted by time. For, example, the original data can be sorted by specific time intervals. Accordingly, travel data in the unit of time and assessment factor data in the unit of time may be combined in the trip unit. As exemplified in FIG. 5, based on preceding travel data and last travel data in a time series among the travel data thus combined, the processor 108 may identify a start location of the preceding travel data and an end location of the last travel data and create a variation of location based on the identified locations. FIG. 5 is a view exemplifying summary data. In FIG. 5, a trip unit or a trip section may corresponds to a trip number. In FIG. 5, figures for location data are expressed by single numbers, but actual location data may consist of multiple numbers (e.g., coordinates, such as latitude and longitude coordinates). In this example, for convenience of explanation, single numbers represent latitude and longitude coordinates. Location data marked in other drawings are illustrated in the same manner as the above description.

The processor 108 may calculate a driving distance in a trip unit by aggregating driving distances of travel data belonging to a trip section. The processor 108 may create assessment factor data by aggregating a number of sudden accelerations and a number of sudden decelerations according to each trip unit. Based on the assessment factor data, the processor 108 may create driving assessment data such as virtual usage-based insurance (UBI) in the trip unit.

Through the above-described process, summary data may have multiple pieces of trip data that record travel data, assessment factor data and driving assessment data.

Next, the processor 108 may create provisional missing data including provisional trip data according to each number of trip misses based on trip data included in at least one trip among a plurality of trips (S115).

Trip data of summary data may be recorded in a single trip unit. In order to create provisional trip data according to each number of trip misses, the processor 108 may produce provisional trip data according to a number of virtual trip misses by combining trip data according to trip numbers exemplified in FIG. 5.

For example, in case a number of trip misses is 1, as exemplified in FIG. 6, trip data corresponding to each trip number of summary data may each become three pieces of virtual trip data. FIG. 6 is a view exemplifying provisional missing data. In case a number of trip misses is 2, two pieces of trip data corresponding to two trip numbers are combined, and thus two pieces of provisional trip data may be created. Specifically, when two pieces of trip data corresponding to Trip No. 1 and Trip No. 2 of FIG. 5 are missing/determined to be missed, provisional trip data corresponding to two trip misses may be created, and when two pieces of trip data corresponding to Trip No. 2 and Trip No. 3 of FIG. 5, other provisional trip data corresponding to two trip misses may be created. Herein, the two pieces of trip data are continuous in a time series or in locations, and provisional trip data corresponding to two trip misses may be created when continuous pieces of trip data are combined. When three pieces of trip data corresponding to three consecutive trip numbers are combined, one piece of provisional trip data may be created.

As for creation of provisional trip data with two trip misses, referring to FIG. 6, a variation of location of provisional trip data may be created by aggregating a variation of location constituting trip data of Trip No. 1 and No. 2. Also, or alternatively, a driving distance of provisional trip data may also be produced by aggregating driving distances constituting trip data of Trip No. 1 and No. 2. Provisional trip data, which is created by combining Trip No. 1 and No. 2, is a type of provisional trip data for two trip misses, and a variation of location and a driving distance, which are provided as detailed data of the provisional trip data, may be referred to as provisional travel data. Also, or alternatively, provisional assessment factor data of provisional trip data may also be created by aggregating assessment factor data constituting trip data of Trip No. 1 and No. 2. Provisional driving assessment data of provisional trip data may be created based on driving assessment data of Trip No. 1 and No. 2. For example, provisional driving assessment data may be calculated as a minimum value of driving assessment data or an average value of driving assessment of Trip No. 1 and No. 2.

The above description may be applied in an same manner to creation of provisional trip data corresponding to n trip misses. Also, or alternatively, predetermined location data may be tagged on provisional trip data or be added to provisional trip data. Location data in a specific format, which is created based on a start location and an end location of trip data used for provisional trip data, may be tagged on the provisional trip data. For example, location data in a specific format may be provided to have, among trip data associated with provisional trip data, at least one of an initial start location and a last end location, a representative location based on the locations, a main stop location between the initial start location and the last end location.

Through the above-described process, provisional trip data may be created to have a table including provisional trip data that is provided according to a number of trip misses.

Figure 7:
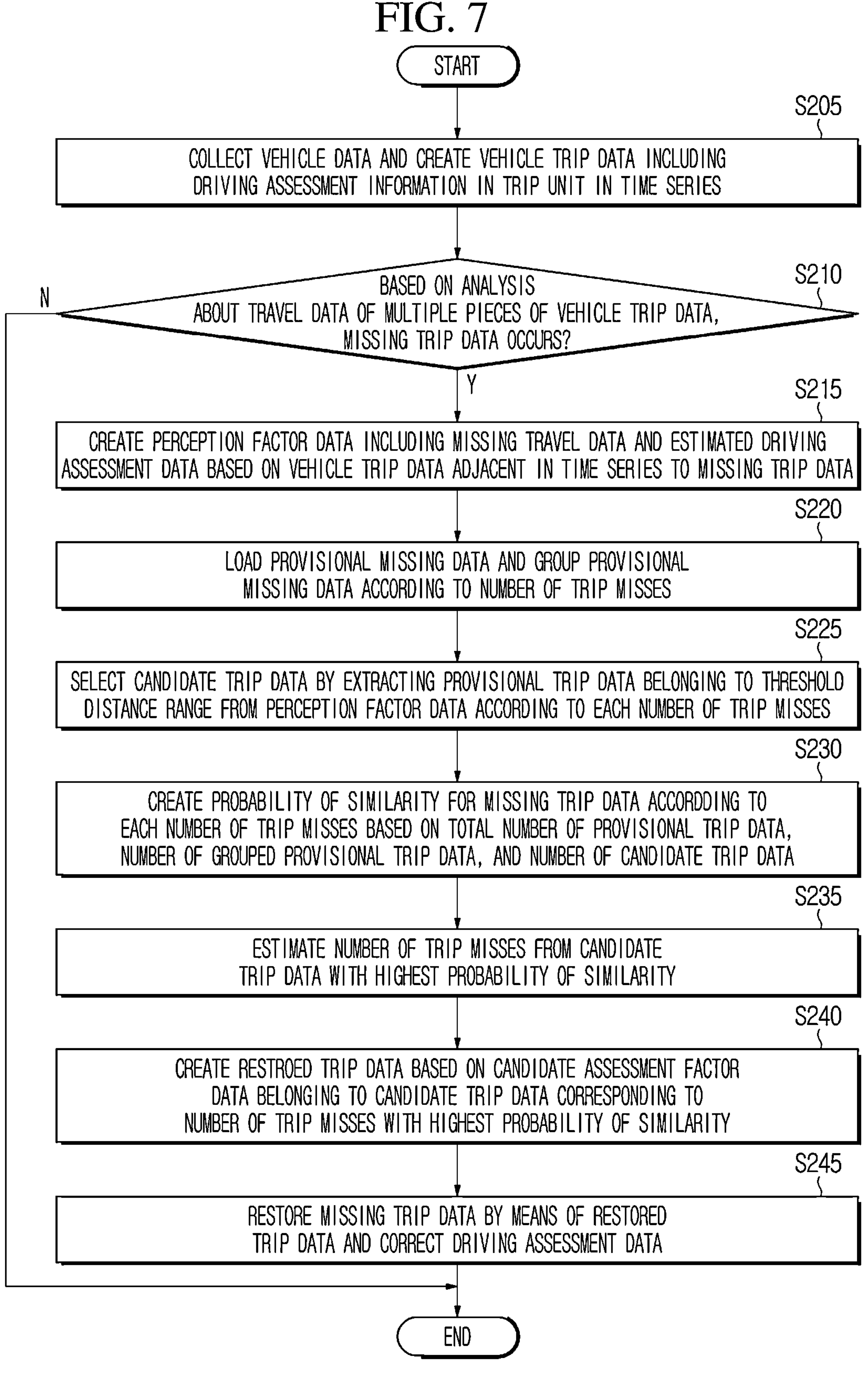
FIG. 7 is a flowchart for a method for correcting driving assessment according to another example of the present disclosure.

FIG. 7 is a flowchart for a method for correcting driving assessment according to another example of the present disclosure. Hereinafter, for convenience of explanation, the vehicle 200 will be described as a vehicle transmitting vehicle data in the present disclosure.

First, the processor 108 of the computing device 100 may collect vehicle data from the vehicle 200 and create vehicle trip data including driving assessment information in a trip unit in a time series (S205).

In the present disclosure, for convenience of explanation, travel data of vehicle data is described to have both location information and a driving distance but may have only either type of the information. Also, or alternatively, assessment factor data of vehicle data exemplifies a history associated with a sudden behavior of the vehicle 200, and specific examples are numbers of sudden acceleration and sudden deceleration in a time section or trip section. However, assessment factor data may further include various data described in FIG. 1 and FIG. 2.

The controller 218 of the vehicle 200 may transmit the vehicle data in the trip unit to the computing device 100. In the present disclosure, the trip unit or a trip section is exemplified to be defined by an operating state of the vehicle 200. For example, the trip unit or trip section may be defined as corresponding to a turned-on state of the vehicle 200, such that a section from a turned-on point to a turned-off point may be designated as the trip unit. The above-described trip unit is described as an example and may be designated as described in FIG. 1 and FIG. 2. After being turned off, the vehicle 200 may create travel data from the turned-on point to the turned-off point and assessment factor data as the vehicle data and transmit the vehicle data to the computing device 100. Similar to a format of trip data of FIG. 5, the travel data may include start and end locations of a trip section, a location variation, and a driving distance. The start location is a location at the turned-on point, the end location is a location of the turned-off point, and the locations may be detected by a positioning sensor. The driving distance may be calculated by the sensor unit 202 and the controller 218 of the vehicle 200. Similar to the trip data of FIG. 5, the assessment factor data may also be created by/based on aggregating a number of sudden accelerations and/or a number of sudden decelerations in a trip section. Sudden acceleration and/or sudden deceleration may be detected by a speed sensor, an acceleration sensor, and/or the controller 218.

The processor 108 of the computing device 100 may create driving assessment data, such as a UBI score, based on assessment factor data of/based on vehicle data. The processor 108 of the computing device 100 may produce vehicle trip data that records travel data, assessment factor data and/or driving assessment data in the trip unit. The vehicle trip data may be created every time vehicle data (e.g., created based on the turning-on/turning-off of the vehicle 200) is received. Thus, the vehicle trip data may be created in a time series according to an order of repeated turning-on/off. Multiple pieces of vehicle trip data sorted in the time series may constitute driving assessment information.

Next, the processor 108 may analyze travel data of the multiple pieces of vehicle trip data caused by the vehicle 200 and determine through the analysis whether or not missing trip data occurs (S210).

Missing trip data may be caused by poor transmission of vehicle data attributable to error of the communication unit 102 or the computing device 100 installed in the vehicle 200, which has been turned off, or poor communication, or driving or parking in a communication shadow area.

As exemplified in FIG. 8, when the processor 108 observes discontinuity of location data recorded in each piece of travel data from the multiple pieces of vehicle trip data, the processor 108 may determine that the vehicle trip data is missing in the discontinued location section. FIG. 8 is a view exemplifying missing vehicle trip data. As another example, as shown in FIG. 8, when the processor 108 identifies a difference between an overall driving distance for a predetermined period received from the vehicle 200 and an aggregate driving distance for the same period received from vehicle data, the processor 108 may determine that vehicle trip data is missing. Also, or alternatively, the processor 108 may determine a location section of missing trip data by identifying a discontinued location section.

In case no missing trip data occurs, the processor 108 may maintain driving assessment information that is continuously created.

In case missing trip data occurs, the processor 108 may create perception factor data inferred from the missing trip data. Specifically, the processor 108 may create perception factor data including missing travel data and estimated driving assessment data based on vehicle trip data adjacent in a time series to the missing trip data (S215).

The missing travel data may be created based on location data of travel data, which precedes in the time series the missing trip data, and location data of travel data that follows the missing trip data. Referring to FIG. 8, the processor 108 may calculate a difference value between end location data of preceding vehicle trip data of the missing trip data and start location data of following vehicle trip data of the missing trip data. The processor 108 may create missing location information that includes a missing location variation based on the calculated difference value, an end location of the preceding vehicle trip data, and a start location of the following vehicle trip data. Also, or alternatively, the processor 108 may calculate a missing driving distance by the method described at step S210. The missing location information and the missing driving distance may constitute missing travel data.

The estimated driving assessment data may be created based on driving assessment data of vehicle trip data adjacent in the time series to the missing trip data. For example, the estimated driving assessment data may be created as an average value or a minimum value of driving assessment data of preceding vehicle trip data and following vehicle trip data, and without being thereto, may be calculated in various manners.

Next, the processor 108 may load provisional missing data and/or group the provisional missing data according to a number of trip misses (S220).

As an example, the provisional missing data may be loaded to include all the provisional trip data irrespective of missing location sections of the missing trip data. As another example, the provisional missing data may be loaded to include provisional trip data in a similar range to the location information of the missing trip data. For example, the location information of the missing trip data may include at least one of an end location of preceding vehicle trip data and/or a start location of following vehicle trip data. The provisional trip data may include provisional location information. The processor 108 may load provisional missing data including the provisional trip data associated with a location for the missing trip data by using the location information of the missing trip data and the provisional location information.

The processor 108 may sort the provisional trip data to group the provisional trip data of the provisional missing data according to the number of trip misses. Similar to FIG. 6, the provisional trip data may be sorted by being grouped according to the number of trip misses.

The processor 108 may select candidate trip data grouped according to the number of trip misses in the provisional trip data based on distribution of the provisional trip data that constitutes the perception factor data and the provisional missing data. Specifically, the processor 108 may select the candidate trip data by extracting the provisional trip data within/satisfying a threshold distance range from the perception factor data according to the number of trip misses (S225).

The candidate trip data may be selected according to the number of trip misses because, even in a same missing location section, driving features (for example, assessment factor data, such as a risky driving index) and driving assessment data may become different according to the number of trip misses.

Figure 9:
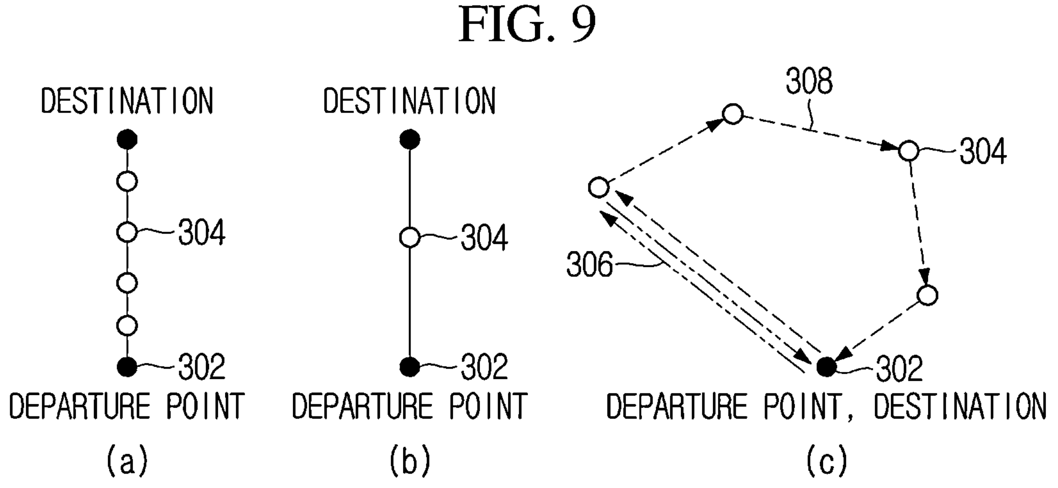
FIG. 9 show exemplified trip misses.

Parts a-c of FIG. 9 are exemplified trip misses. As shown in FIG. 9, a trip 302, where vehicle data is normally transmitted, is a trip near a departure point and a destination, and vehicle trip data is missing because poor transmission of vehicle data occurs in a route from the departure point to the destination. In case there is a long distance from a departure point to a destination, a driving feature and driving assessment may be different according to a trip type of a missing section. In case a vehicle speed is slow because traffic flow is heavily congested, the vehicle 200 may be parked for break in a service area while being turned off, and thus a provisional trip 304 may become frequent as in part a of FIG. 9. In this case, a risky driving index for sudden acceleration and sudden deceleration of the missing trip, that is, assessment factor data may not appear to be high.

As shown in FIG. 9*b*, in case the number of the provisional trip 304 is small, speeding or acceleration in the missing trip may be estimated to have a high probability.

As shown in FIG. 9*c*, in case a departure point and a final destination are identical, various provisional routes may be estimated. For example, a first provisional route 306 for driving between home and office during rush hours may have low possibility of acceleration/speeding. However, a second provisional route 308, which stops by many regions even though a departure point and a destination are identical, may have high driving risk. Furthermore, the number of missing trips may be different according to the first and second provisional routes 306 and 308. According to different numbers of trip misses, e.g., as exemplified in FIG. 9, average factor data, such as degrees of sudden acceleration and/or sudden deceleration, may be different.

Figure 10:
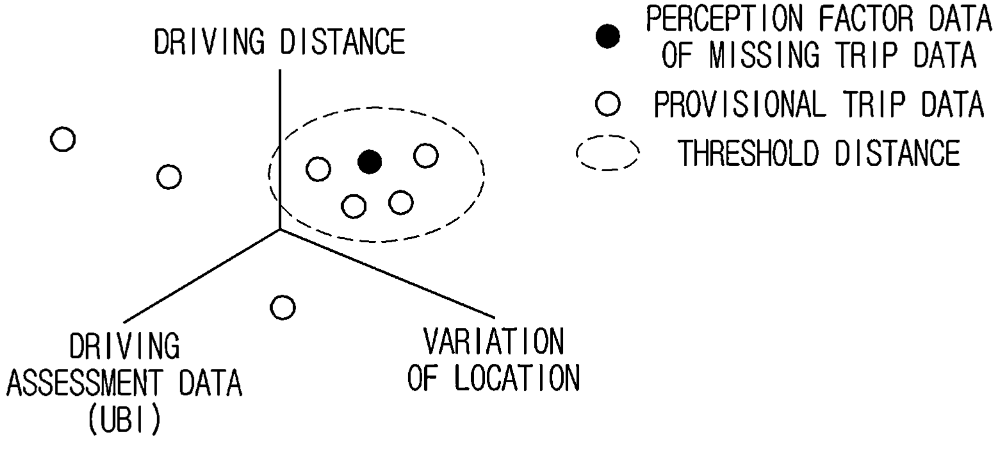
FIG. 10 is a view exemplifying selection of candidate trip data.
Figure 10:
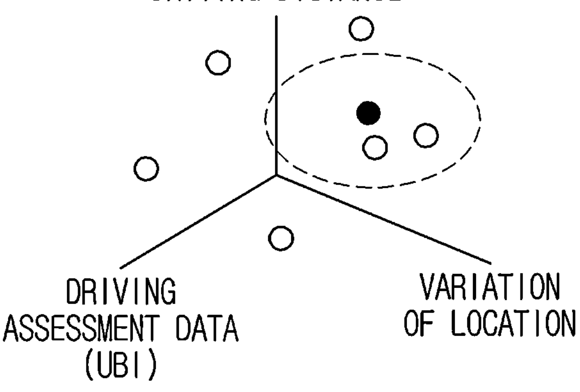
Figure 10:
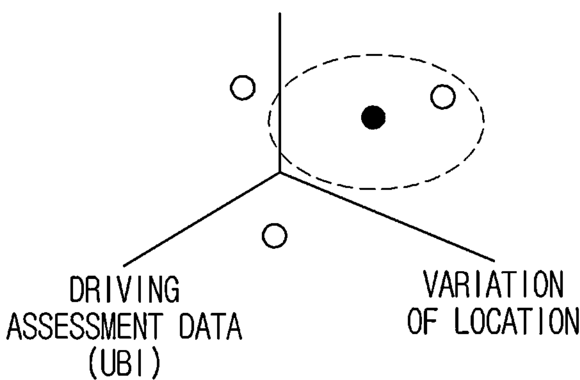

FIG. 10 is a view exemplifying selection of candidate trip data. The processor 108 may create a distribution of perception factor data and provisional trip data, which are associated with missing trip data, according to a number of trip misses. The perception factor data may include a missing location variation, a missing driving distance, and/or estimated driving assessment data, and the values may correspond respectively to a location variation, a driving distance, and/or driving assessment data in a three-dimensional coordinate system according to the number of trip misses exemplified in FIG. 9, so that the perception factor data may be located as a specific coordinate in the coordinate system. As exemplified in FIG. 10, the processor 108 may express provisional trip data, which is grouped according to a number of misses, in a coordinate system according to a number of trip misses. Data constituting provisional trip data (e.g., a location variation, a driving distance, and/or provisional driving assessment data corresponding to a location variation, a driving distance, and/or driving assessment data in the coordinate system according to the number of trip misses exemplified in FIG. 9) may be located in a specific coordinate of the coordinate system. Thus, a distribution between perception factor data and provisional trip data may be created according to a number of trip misses.

The processor 108 may select candidate trip data by extracting the provisional trip data belonging to a threshold distance range from the perception factor data according to each number of trip misses.

The processor 108 may create a probability of similarity for the missing trip data according to each number of trip misses, based on data volumes for the provisional trip data, provisional trip data grouped according to the number of trip misses, and/or the candidate trip data, respectively (S230).

As exemplified in FIG. 11, the processor 108 may create a probability of similarity for the missing trip data based on a total number of the provisional trip data, a number of the grouped provisional trip data, and/or a number of the candidate trip data. FIG. 11 is a view exemplifying creation of recovery trip data. Referring to FIG. 11, the total number of provisional trip data belonging to provisional missing data is (a), the number of provisional trip data grouped according to the number of trip misses is (b), and the number of candidate trip data belonging to a threshold distance range in the grouped provisional trip data is denoted by (c). Those numbers may each be aggregated according to the number of trip misses.

A probability of similarity according to the number of trip misses may be calculated based on first probability data between data volumes (that is, numbers) of the provisional trip data and the grouped provisional trip data and second probability data between data volumes (that is, numbers) of the grouped provisional trip data and the candidate trip data. Specifically, a first probability $P(Y)/P(X)$ for the number of misses may be calculated by b/a, and a second probability $P(X|Y)$ of a similar case to actual missing data may be calculated by c/b. A probability of similarity $P(Y|X)$ according to each number of trip misses may be calculated by $P(X|Y)*P(Y)/P(X)$.

Next, the processor 108 may estimate a number of trip misses from candidate trip data with a highest probability of similarity among probabilities of similarity that are created according to each number of trip misses (S235).

As exemplified in FIG. 11, because a probability of similarity according to a single trip miss is higher than all the other probabilities of similarity according to the other numbers of misses, the processor 108 may predict that there is one trip miss. That is, the processor 108 may determine that candidate trip data with a highest probability of similarity has a maximum matching degree with the missing trip data. Apart from the above-described process, candidate trip data with a highest matching degree with missing trip data may be selected through various processes.

Next, the processor 108 may create restored trip data based on candidate assessment factor data that belongs to the candidate trip data corresponding to the number of trip misses with the highest probability of similarity (S240).

As exemplified in FIG. 11, in case there are 30 pieces of candidate trip data corresponding to a single trip miss that is estimated with a highest probability of similarity, the processor 108 may create restored trip data based on an average of candidate assessment factor data that belongs to the 30 pieces of candidate trip data. For example, average numbers of sudden accelerations and sudden decelerations, which belong to candidate trip data with the single trip miss, are calculated respectively, and the average values may be configured as the restored trip data. As another example, the restored trip data may be created as a weighted average of candidate assessment factor data associated with the highest probability of similarity.

Next, the processor 108 may restore the missing trip data by means of the restored trip data and correct the driving assessment data by creating driving assessment data based on restored assessment factor data of the restored trip data (S245).

By sending the corrected driving assessment data at a request of the electronic devices 200 to 500, the processor 108 may transmit driving assessment information including the corrected driving assessment data and other data to the electronic devices 200 to 500. For example, the other data may include at least one of location data of a missing section, a variation of a missing location, a missing driving distance, and restored assessment factor data.

According to the present disclosure, missing data may be corrected with high accuracy to implement good driving assessment despite omission of data used for driving assessment.

The present disclosure is technically directed to providing a method for correcting driving assessment and a computing device, which correct missing data with high accuracy to implement good driving assessment despite omission of data used for driving assessment.

The technical problems solved by the present disclosure are not limited to the above technical problems and other technical problems which are not described herein will be clearly understood by a person having ordinary skill in the technical field, to which the present disclosure belongs, from the following description.

A method for correcting driving assessment may comprise: creating vehicle trip data in a time series that includes driving assessment data based on vehicle data; in response to occurrence of missing trip data among multiple pieces of vehicle trip data, creating perception factor data that is inferred from the missing trip data; based on a distribution between the perception factor data and provisional trip data constituting pre-prepared provisional missing data, selecting candidate trip data that is grouped according to a number of trip misses among the provisional trip data; estimating the number of trip misses from the grouped candidate trip data that has a highest matching degree for the missing trip data; and restoring the missing trip data based on candidate assessment factor data that belongs to the candidate trip data corresponding to the estimated number of trip misses.

The vehicle trip data may be created in a trip unit according to a preset condition, and the condition is defined by at least one of an operating state of the vehicle, an operating distance, an operating time, and a location of the vehicle.

The vehicle data may include travel data and assessment factor data, the travel data may has at least one of location information in a trip unit and a driving distance in the trip unit, the assessment factor data is used to create the driving assessment factor data, and the assessment factor data includes data associated with at least one of a sudden behavior of the vehicle, a behavior of the vehicle in a driving caution zone, an external driving environment of the vehicle, and a user request in an autonomous driving mode.

The perception factor data may include missing travel data and estimated driving assessment data, the missing travel data is created based on travel data of the vehicle trip data that is adjacent in a time series to the missing trip data, and the estimated driving assessment data is created based on the driving assessment data of the adjacent vehicle trip data.

The provisional missing data may be provided by using summary data that has multiple pieces of trip data that record the vehicle data and the driving assessment data in the trip unit, and wherein the provisional missing data includes the provisional trip data that is provided according to the number of trip misses based on the trip data included in at least one trip.

The provisional missing data may be selected based on location information of the missing trip data.

The selecting of the candidate trip data may comprise selecting the candidate trip data by extracting the provisional trip data, which belongs to a threshold distance range, from the perception factor data according to the number of trip misses.

The estimating of the number of trip misses may comprise: creating probabilities of similarity for the missing trip data according to the number of trip misses, based on a data volume of each of the provisional trip data belonging to the provisional missing data, the provisional trip data that is grouped according to the number of trip misses, and the candidate trip data; and predicting the number of trip misses from the candidate trip data that has a highest probability of similarity among the created probabilities of similarity.

The restoring of the missing trip data may comprise restoring the missing trip data by an average or a weighted average for the candidate assessment factor data belonging to the candidate trip data, when the candidate trip data corresponding to the estimated number of trip misses is in a plural number.

The creating of the probabilities of similarity according to the number of trip misses may comprise calculating the probabilities of similarity according to the number of trip misses based on first probability data between a data volume of the provisional trip data belonging to the provisional missing data and a data volume of the grouped provisional trip data and second probability data between the data volume of the grouped provisional trip data and a data volume of the candidate trip data.

According to another example of the present disclosure, a computing device for correcting driving assessment may comprise: a communication unit configured to communicating with a vehicle; a memory configured to store data, which is exchanged with the vehicle, and at least one instruction; and a processor configured to execute the at least one instruction that is stored in the memory and processes the data, wherein the processor is further configured to: create vehicle trip data in a time series that includes driving assessment data based on vehicle data, in response to occurrence of missing trip data among multiple pieces of vehicle trip data, create perception factor data that is inferred from the missing trip data, based on a distribution between the perception factor data and provisional trip data constituting pre-prepared provisional missing data, select candidate trip data that is grouped according to a number of trip misses among the provisional trip data, estimate the number of trip misses from the grouped candidate trip data that has a highest matching degree for the missing trip data, and restore the missing trip data based on candidate assessment factor data that belongs to the candidate trip data corresponding to the estimated number of trip misses.

According to another example of the present disclosure, a system may comprise: a computing device for correcting driving assessment; and an electronic device for receiving corrected driving assessment, wherein the computing device comprises a memory configured to store at least one instruction and a processor configured to execute the at least one instruction that is stored in the memory, and wherein the processor is further configured to: create vehicle trip data in a time series that includes driving assessment data based on vehicle data, in response to occurrence of missing trip data among multiple pieces of vehicle trip data, create perception factor data that is inferred from the missing trip data, based on a distribution between the perception factor data and provisional trip data constituting pre-prepared provisional missing data, select candidate trip data that is grouped according to a number of trip misses among the provisional trip data, estimate the number of trip misses from the grouped candidate trip data that has a highest matching degree for the missing trip data, restore the missing trip data based on candidate assessment factor data that belongs to the candidate trip data corresponding to the estimated number of trip misses, and correct the driving assessment data based on the restored missing trip data and transmit the corrected driving assessment data to the electronic device.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, it is possible to provide a method for correcting driving assessment and a computing device, which correct missing data with high accuracy to implement good driving assessment despite omission of data used for driving assessment.

The effects obtainable from the present disclosure are not limited to the above-mentioned effects, and other effects not mentioned herein will be clearly understood by those skilled in the art through the following descriptions.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various examples of the present disclosure are not a list of all possible combinations and are intended to describe representative aspects of the present disclosure, and the matters described in the various examples may be applied independently or in combination of two or more.

Also, or alternatively, various examples of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various examples to be executed on an apparatus or a computer, a non-transitory computer-readable medium having such software or commands stored thereon and executable on the apparatus or the computer.

What is claimed is:

1. A method comprising:

creating a time series of vehicle trip data comprising driving assessment data based on vehicle data from a vehicle;

creating, based on a determination of trip data missing from the time series of the vehicle trip data, perception factor data associated with the missing trip data;

based on a distribution between the perception factor data and provisional trip data from provisional missing data, selecting candidate trip data that is grouped according to a plurality of counts of trip misses from the provisional trip data;

estimating a count of trip misses based on the group of candidate trip data that has a highest matching degree with the missing trip data;

restoring the missing trip data based on candidate assessment factor data from the candidate trip data corresponding to the estimated count of trip misses; and controlling autonomous driving of the vehicle by generating control information based on the time series of the vehicle trip data comprising the restored missing trip data and the driving assessment data.

2. The method of claim 1, wherein the vehicle trip data is created for a trip unit according to a preset condition defined by at least one of: an operating state of the vehicle, an operating distance, an operating time, or a location of the vehicle.

3. The method of claim 1, wherein the vehicle data comprises:

travel data comprising at least one of location information for a trip unit or a driving distance for the trip unit, and assessment factor data comprising data associated with at least one of:

a sudden behavior of the vehicle, a behavior of the vehicle in a driving caution zone,
an external driving environment of the vehicle, or
a user request in an autonomous driving mode,
wherein the driving assessment data is based on the assessment factor data.

4. The method of claim 1, wherein the perception factor data comprises:
missing travel data based on travel data of vehicle trip data that is adjacent in the time series to the missing trip data, and
estimated driving assessment data based on driving assessment data of the adjacent vehicle trip data.

5. The method of claim 1, wherein the provisional missing data is based on summary data comprising multiple pieces of trip data corresponding the vehicle data and the driving assessment data to one or more trip units, and
wherein the provisional missing data comprises a portion of the provisional trip data, wherein the portion is based on the count of trip misses based on the trip data corresponding to at least one of the one or more trip units.

6. The method of claim 5, wherein the provisional missing data is selected based on location information associated with the missing trip data.

7. The method of claim 1, wherein the selecting of the candidate trip data comprises extracting, based on the plurality of counts of trip misses, the provisional trip data within a threshold distance range from the perception factor data.

8. The method of claim 1, wherein the estimating of the count of trip misses comprises:
creating probabilities of similarity for the missing trip data according to the plurality of counts of trip misses, wherein the probabilities are based on a data volume of each of:
the provisional trip data belonging to the provisional missing data,
the provisional trip data that is grouped according to the count of trip misses, and
the candidate trip data; and
estimating the count of trip misses from the candidate trip data that has a highest probability of similarity among the probabilities of similarity.

9. The method of claim 8, wherein the restoring of the missing trip data comprises restoring the missing trip data as an average or a weighted average of the candidate assessment factor data from the candidate trip data.

10. The method of claim 8, wherein the creating the probabilities of similarity comprises determining the probabilities of similarity based on first probability data and second probability data, wherein the first probability data is associated with a data volume of the provisional trip data belonging to the provisional missing data and a data volume of the grouped provisional trip data, and wherein the second probability data is associated with the data volume of the grouped provisional trip data and a data volume of the candidate trip data.

11. A computing device comprising:
a memory comprising at least one instruction; and
a processor, wherein the at least one instruction, when executed by the processor, configure the processor to:
create a time series of vehicle trip data comprising driving assessment data based on vehicle data received from a vehicle,
create, based on a determination of trip data missing from the time series of the vehicle trip data, perception factor data associated with the missing trip data,
based on a distribution between the perception factor data and provisional trip data from provisional missing data, select candidate trip data that is grouped according to a plurality of counts of trip misses from the provisional trip data,
estimate a count trip misses based on the group of candidate trip data that has a highest matching degree with the missing trip data,
restore the missing trip data based on candidate assessment factor data from the candidate trip data corresponding to the estimated count of trip misses, and
control autonomous driving of the vehicle by generating control information based on the time series of the vehicle trip data comprising the restored missing trip data and the driving assessment data.

12. The computing device of claim 11, wherein the vehicle trip data is created for a trip unit according to a preset condition defined by at least one of: an operating state of the vehicle, an operating distance, an operating time, or a location of the vehicle.

13. The computing device of claim 11, wherein the vehicle data comprises:
travel data comprising at least one of location information for a trip unit or a driving distance for the trip unit, and
assessment factor data comprising data associated with at least one of:
a sudden behavior of the vehicle,
a behavior of the vehicle in a driving caution zone,
an external driving environment of the vehicle, or
a user request in an autonomous driving mode,
wherein the driving assessment data is based on the assessment factor data.

14. The computing device of claim 11, wherein the perception factor data comprises:
missing travel data based on travel data of vehicle trip data that is adjacent in the time series to the missing trip data, and
estimated driving assessment data based on driving assessment data of the adjacent vehicle trip data.

15. The computing device of claim 11, wherein the provisional missing data is based on summary data comprising multiple pieces of trip data corresponding the vehicle data and the driving assessment data to one or more trip units, and
wherein the provisional missing data comprises a portion of the provisional trip data, wherein the portion is based on the count of trip misses based on the trip data corresponding to at least one of the one or more trip units.

16. The computing device of claim 15, wherein the provisional missing data is selected based on location information associated with the missing trip data.

17. The computing device of claim 11, wherein the selecting of the candidate trip data comprises extracting, based on the plurality of counts of trip misses, the provisional trip data within a threshold distance range from the perception factor data.

18. The computing device of claim 11, wherein the at least one instruction, when executed by the processor, configures the processor to estimate the count of trip misses by:
creating probabilities of similarity for the missing trip data according to the plurality of counts of trip misses, wherein the probabilities are based on a data volume of each of:
the provisional trip data belonging to the provisional missing data, the provisional trip data that is grouped according to the count of trip misses, and the candidate trip data; and estimating the count of trip misses from the candidate trip data that has a highest probability of similarity among the probabilities of similarity.

19. The computing device of claim 18, wherein the at least one instruction, when executed by the processor, configures the processor to restore the missing trip data as an average or a weighted average of the candidate assessment factor data from the candidate trip data.

20. A system comprising:

a computing device; and a vehicle, wherein the computing device comprises:

a memory comprising at least one instruction, and a processor, wherein the at least one instruction, when executed by the processor, configures the processor to:

create a time series of vehicle trip data comprising driving assessment data based on vehicle data from the vehicle, create, based on a determination of trip data missing from the time series of the vehicle trip data, perception factor data associated with the missing trip data, based on a distribution between the perception factor data and provisional trip data from provisional missing data, select candidate trip data that is grouped according to a plurality of counts of trip misses from the provisional trip data, estimate a count of trip misses based on the group of candidate trip data that has a highest matching degree with the missing trip data, restore the missing trip data based on candidate assessment factor data from the candidate trip data corresponding to the estimated count of trip misses, send information, based on the restored missing trip, configured to control one or more operations of the vehicle, and control autonomous driving of the vehicle by generating control information based on the time series of the vehicle trip data comprising the restored missing trip data and the driving assessment data, wherein the vehicle is configured to receive the information.

* * * * *